(No Model.)
F. H. MAYER.
TOOL FOR REPAIRING PNEUMATIC TIRES.
No. 582,143. Patented May 4, 1897.
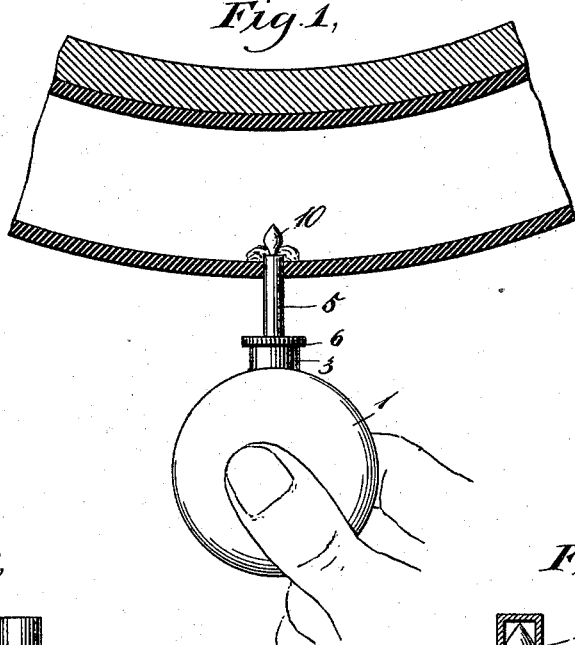
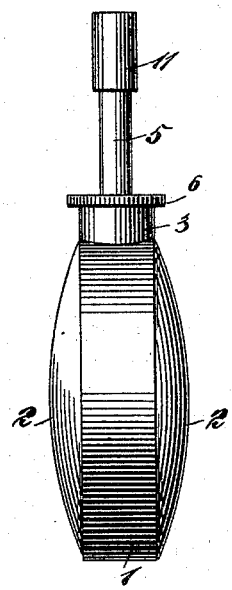
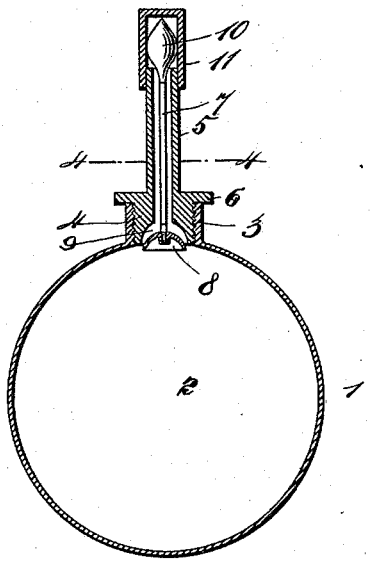
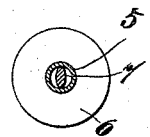
WITNESSES:
Edward Thorpe
C. R. Ferguson
INVENTOR
F. H. Mayer
BY 
ATTORNEYS.

UNITED STATES PATENT OFFICE.

FRANK H. MAYER, OF DENVER, COLORADO.

TOOL FOR REPAIRING PNEUMATIC TIRES.

SPECIFICATION forming part of Letters Patent No. 582,143, dated May 4, 1897.

Application filed February 8, 1897. Serial No. 622,496. (No model.)

*To all whom it may concern:*

Be it known that I, FRANK H. MAYER, of Denver, in the county of Arapahoe and State of Colorado, have invented a new and Improved Tool for Repairing Pneumatic Tires, of which the following is a full, clear, and exact description.

This invention relates to devices for repairing punctures and rents in pneumatic tires for bicycles or other wheeled vehicles; and the object is to provide a simple device by means of which a liquid cement may be injected into the tire, where it may be allowed to harden over the puncture or rent.

I will describe a tool for repairing pneumatic tires embodying my invention and then point out the novel features in the appended claims.

Reference is to be had to the accompanying drawings, forming a part of this specification, in which similar characters of reference indicate corresponding parts in all the views.

Figure 1 is a side elevation of a device embodying my invention and showing the same in position in a pneumatic tire. Fig. 2 is an edge view of the device. Fig. 3 is a sectional elevation, and Fig. 4 is a section on the line 4 4 of Fig. 3.

The invention comprises a receptacle 1 for containing a liquid cement, such, for instance, as a solution of rubber, gum, &c. The receptacle consists of suitable metal and has compressible sides 2, so that the air-pressure caused by forcing the sides inward will force the cement out of the receptacle. The receptacle has a spout 3, interiorly threaded to engage the exterior screw-thread of an enlarged portion 4 of a straight tubular outlet 5. The tubular outlet 5 at its junction with the enlarged portion 4 may be provided with a milled flange 6, so that the parts may be readily screwed together or detached.

Movable longitudinally in the outlet-tube 5 is a needle-shank 7. This needle-shank 7 is sufficiently small to provide a space between it and the interior of the tube 5 for the passage of sealing or cementing material. It is desired that there shall be no lateral movement of the shank 7 in the tube 5, and for this purpose I have shown said shank as oval in cross-section with its greater diameter bearing against the inner wall of the tube. The inner end of the shank 7 is provided with a valve-plate 8, designed to engage in a cup-shaped valve-seat 9, formed in the inner end of the enlarged portion 4 of the tube. Preferably the valve 8 will have a screw-thread engagement with the shank 7, so that said valve may be removed when it is desired to remove the shank for the purpose of cleaning the shank and the interior of the tube.

The shank 7 terminates at its outer end in a bulb-shaped needle-point 10, the greatest diameter of said point being substantially equal to the outer diameter of the tube 5, so that when said point is forced through a puncture or rent in a tire a hole will be made sufficiently large for the passage of the tube 5. When not in use, the needle-point 10 may be inclosed in a cover 11, engaged with the end of the tube 5.

The operation of the device is as follows: The receptacle being filled with cementing material, the tube containing the needle is screwed into place, and then the needle-point is forced through the puncture to the interior of the tire, and the end of the tube 5 is also forced through the puncture, as plainly indicated in Fig. 1. A firm pressure being exerted on the yielding sides of the receptacle, the compressed air will force the cementing liquid up into the tube 5 and around the needle-shank, and this cementing material will be forced out through the end of the tube 5, where it will spread out around the head of the needle substantially in ring form. The same compression of air in the receptacle by acting against the valve 8 will force the same to its seat and thus prevent a further discharge of liquid from the receptacle, thus preventing too large a quantity from being distributed around the needle-point. The bulb-like form of the needle-point serves to deflect the cementing material in lateral directions, and upon withdrawing the tool a certain amount of the cementing liquid will be drawn into the puncture, and there remaining on the interior of the tube will spread, and when it becomes hardened will effectually seal the puncture.

It is obvious that instead of a plate-valve 8, attached to the inner end of the shank 7, I may employ a spider-like construction, as one object is to form a stop to prevent the needle from moving too far outward.

Having thus described my invention, I claim as new and desire to secure by Letters Patent—

1. A tool for repairing tires, comprising a compressible receptacle for liquid sealing or cementing material, a tubular outlet for said receptacle, a needle-shank movable longitudinally in said tubular outlet, a needle-point on the outer end of said shank, the greatest diameter of said needle-point being substantially that of the diameter of the tubular outlet, and a stop on the inner end of the needle-shank, to prevent its movement too far outward, substantially as specified.

2. A tool for repairing pneumatic tires, comprising a compressible receptacle, a straight tubular outlet therefor, a needle-shank movable longitudinally in said outlet, means for preventing a lateral movement of said shank in the outlet, a bulb-like needle-point on the outer end of the shank, the largest diameter of said needle-point being substantially equal to that of the tubular outlet, and a stop on the inner end of said shank portion, the said stop also serving as a valve, substantially as specified.

3. A tool for repairing pneumatic tires, comprising a compressible receptacle, a straight tubular outlet having a screw-thread engagement with the outlet of said receptacle, a needle-shank extended through the tubular outlet, the said shank being oval in cross-section, whereby it may be engaged with the interior of the tubular outlet at opposite sides, a valve-plate on the inner end of the said shank, adapted to engage in a valve-seat formed at the inner end of the tubular outlet, and a bulb-shaped needle-point on the outer end of the shank, substantially as specified.

4. A tool for repairing pneumatic tires, comprising a compressible receptacle, a straight tubular outlet for said receptacle, a needle-stem extended through said tubular outlet, a plate-valve having screw-thread engagement with the inner end of said shank, a bulb-like needle-point on the outer end of said shank, the greatest diameter of which is substantially that of the exterior of the outlet-tube, and a cap or cover for said needle-point, substantially as specified.

FRANK H. MAYER.

Witnesses:
L. B. FRANCE,
ALEX. STEWART.